United States Patent
Villarreal-Trevino et al.

(10) Patent No.: US 6,395,056 B1
(45) Date of Patent: May 28, 2002

(54) METHOD FOR THE HEAT TREATMENT OF IRON ORE LUMPS IN A REDUCTION SYSTEM

(75) Inventors: Juan A. Villarreal-Trevino, Guadalupe; Jose María Eloy Aparicio-Arranz, San Nicholas de los Garza; Ricardo Viramontes-Brown, San Pedro Garza Garcia; Juan Celada-Gonzalez, San Pedro Garza Garcia; Raul Gerardo Quintero-Flores, San Pedro Garza Garcia; Roberto Octaviano Flores-Serrano, Monterrey, all of (MX)

(73) Assignee: Hylsa S.A. de C.V., San Nicolas de los Garza (MX)

( * ) Notice: Subject to any disclaimer, the term of this patent is extended or adjusted under 35 U.S.C. 154(b) by 0 days.

(21) Appl. No.: 09/368,378

(22) Filed: Aug. 4, 1999

Related U.S. Application Data

(60) Continuation-in-part of application No. 09/175,396, filed on Oct. 19, 1998, now Pat. No. 6,039,916, which is a division of application No. 08/719,930, filed on Sep. 25, 1996, now Pat. No. 5,858,057.
(60) Provisional application No. 60/095,591, filed on Aug. 6, 1998.

(51) Int. Cl.$^7$ ............................................. C21B 13/14
(52) U.S. Cl. .................................... 75/496; 75/505
(58) Field of Search ......................... 75/489, 490, 491, 75/492, 493, 494, 495, 496, 497, 498, 505; 266/175

(56) References Cited

U.S. PATENT DOCUMENTS

| | | |
|---|---|---|
| 692,539 A | 2/1902 | Niewerth |
| 1,401,222 A | 12/1921 | Wiberg |

(List continued on next page.)

OTHER PUBLICATIONS

Yaginawa et al., "Theoretical and experimental study on the reduction of iron ore pellets in moving bed", Proceedings of the Third International Iron and Steel Congress, Apr. 16–20, 1978, published by American Society for Metals, pp. 449–459.

Takahashi et al., "Operation and Simulation of Pressurized Shaft Furnance for Direct Reduction", Proceedings of the 43rd Ironmaking Conference, Apr. 1–4, 1984, vol. 43, published by Iron & Steel Society, pp. 485–500.

*Primary Examiner*—Melvyn Andrews
(74) *Attorney, Agent, or Firm*—A. Thomas; S. Safford; Frommer Lawrence Haug LLP

(57) ABSTRACT

A method and apparatus for the production of prereduced iron ore, DRI, sponge iron or the like by the gaseous reduction of iron-oxide containing particles in a reduction system which comprises a preheating device for the iron ore particles. The preheating device preserves the strength of the iron ore particles through the reduction system by preheating the particles with non-reducing (or preferably oxidizing) gas, whereby the DRI or like material produced is stronger than if it were processed in a reduction reactor without said preheating device. The invention thereby avoids sticking and fines production problems which some iron ores cause in the reduction reactor. The preheating device also produces other advantages in the reduction system as, for example, that the reducing gas reaches a higher degree of oxidation in the reduction reactor whereby the productivity of the reduction system increases as a result of the decreased amount of reducing gas as well as the decreased residence time required. A further advantage produced by the invention is that the recycled reducing gas can be preheated by heat-exchange with the gas stream effluent from the reduction reactor at a higher temperature as a result of the preheating of the iron ore particles.

7 Claims, 5 Drawing Sheets

U.S. PATENT DOCUMENTS

| | | |
|---|---|---|
| 1,645,968 A | 10/1927 | Percy |
| 2,740,706 A * | 4/1956 | Paull et al. .................... 75/495 |
| 2,807,535 A | 9/1957 | Segre |
| 2,873,183 A | 2/1959 | Pike |
| 2,996,373 A * | 8/1961 | Agarwal ....................... 75/450 |
| 3,063,695 A | 11/1962 | DeVaney |
| 3,684,486 A | 8/1972 | Osman |
| 3,776,533 A * | 12/1973 | Vlnaty ....................... 266/175 |
| 4,212,452 A | 7/1980 | Hsieh |
| 4,268,303 A | 5/1981 | Kaneko et al. |
| 4,643,110 A | 2/1987 | Lisowyj et al. |
| 5,858,057 A | 1/1999 | Celada-Gonzales et al. |

* cited by examiner

METHOD FOR THE HEAT TREATMENT OF IRON ORE LUMPS IN A REDUCTION SYSTEM

RELATED APPLICATIONS

This application claims the benefit of provisional application Ser. No. 60/095,591 filed Aug. 6, 1998.

This application is a continuation-in-part of application Ser. No. 09/175,396 filed Oct. 19, 1998 now U.S. Pat. No. 6,039,916 which is a divisional of Ser. No. 08/719,930 filed Sep. 25, 1996 now U.S. Pat. No. 5,858,057.

FIELD OF THE INVENTION

The present invention relates to a method and apparatus for the production of prereduced iron ore, Direct Reduced Iron (DRI), sponge iron, or the like by the gaseous reduction of iron-oxide containing particles (iron oxide lump ore), in a reduction system which comprises a preheating device for said particles, a reduction reactor, a source of natural gas, and a heating device. The natural gas is transformed in the operation of said system by means of a reformer or by the catalytic action of the metallic iron within said reduction reactor, to a reducing gas having carbon monoxide and hydrogen as its main constituents. The heating device heats said reducing gas prior to its introduction into said reduction reactor. More particularly, the invention relates to a method and apparatus which preserves the strength of iron-oxide-containing particles while they are reduced to metallic iron. The pre-reduction strengthening allows for the use of mechanically weak iron-oxide-containing particles as the charge for said reduction reactor while avoiding the sticking and fines problems associated with the use of said particles. The invention provides a method and apparatus for processing iron ore particles which otherwise would not be possible in a moving bed direct reduction process.

The invention also provides other advantages as, for example, that the reducing gas reaches a high degree of oxidation in the reduction reactor whereby the productivity of the reduction system increases as a result of the decreased amount of reducing gas as well as the decreased residence time required. A further advantage produced by the invention is that the recycled reducing gas can be preheated by heat-exchange with the gas stream effluent from the reduction reactor at a higher temperature as a result of the preheating of the iron ore particles.

BACKGROUND OF THE INVENTION

In steelmaking processes and specifically in direct reduction processes, it is well known to those skilled in the art that the structural changes and chemical reactions that take place in the iron-oxide-containing materials, cause mechanical weakness and disintegration, especially when said materials are in the form of lumps and/or pellets.

During the chemical transformation of the ore particles comprising iron oxides such as hematite and/or magnetite to metallic iron, there are several steps and methods to be followed. The present invention relates to a method and apparatus that provides a successful way to maintain the strength of the iron ore lumps or pellets throughout the reduction process.

Without committing the patentability and functionality of the present invention to a particular theory, and based on currently available technical literature, the applicants propose that the structural changes caused by the removal of oxygen from the iron-oxide material, represents one cause of the weakening of the iron ore lumps and pellets. The reduction reaction from $Fe_2O_3$ to $Fe_3O_4$ (hematite to magnetite respectively) changes the crystalline structure of the iron-oxide containing particles. Yaginawa et al. ("Theoretical and experimental study on the reduction of iron ore pellets in moving bed", Proceedings of the Third International Iron and Steel Congress, Apr. 16–20, 1978, published by American Society for Metals, pages 449–459.) found that the decrease of strength was slight if the reduction time was under 75 minutes. In the prior art, the continuous feeding of iron-oxide containing particles is carried out at ambient temperature, it takes a significant time to heat and reduce the material (about 3 hours). The present invention comprises the pre-heating of the material in an oxidizing atmosphere so as to preserve the strength of the crystalline structure. Preheating the iron-oxide containing particles to 700° C. in the reduction reactor, allows the retention time between the hematite to magnetite to be decreased, and allows a smooth change between the stereometry between the structures of hematite and magnetite.

Another cause for the weakening of the iron-oxide containing particles is believed to be that during heating and reduction of iron-oxide materials from an ambient temperature to a high temperature (above 650° C.), the strength of the iron-oxide containing particles decreases significantly in the temperature range between 700° to 1,100° C. After this range, strength is recovered by the formation of the metallic iron in the material structure.

Osman (U.S. Pat. No. 3,684,486) describes a reduction process where the iron ore is heated in a fixed bed reactor above said temperature range using an oxidizing gas and the iron ore is subsequently reduced. Even though Osman detected the effect of preheating the iron ore before reduction on the strength of the sponge iron produced, this reference does not suggest or disclose the great and surprising benefits thereof when the ore is reduced in a moving bed reactor where the particles are subjected to inter-particle movements and pressures and therefore are much more prone to disintegration and fines production. A person skilled in the art of moving bed reduction systems hardly would look for a solution to these problems in a reference disclosing a reduction system in a fixed bed, because these problems are different conceptually and in practice. The main difference between the reduction process in a moving bed and the reduction in a fixed bed, is that the reaction front in a fixed bed is moving along the reactor, and when the reduction is performed in a moving bed, the reaction front is stationed at a specific level of the reactor.

The present invention comprises a step of preheating iron ore with an oxidizing gas applied to a moving bed reactor, thus avoiding the formation of fines within the temperature range between 750° and 1,100° C. caused by the low strength, abrasion, ferrostatic pressure and motion. Said weakening in the structural strength of the iron ore in continuous reactors causes the formation of fines, which in turn produces several problems in the performance of the reactor operations such as hot spots, channelization, agglomerations, etc.

Another advantage of preheating the iron-oxide-containing particles and of feeding in a continuous mode said iron-oxide-containing particles to the reactor at high temperature, is that the requirement of a reducing gas is diminished. Since the heating potential of the reducing gas is not required to heat the charge from ambient temperature to at least 700° C., those skilled in the art can visualize the advantageous use of the reducing gas.

This invention is herein described as applied to lumps of iron ore, but it will be evident to those skilled in the art that it is also applicable to pellets, sinter or otherwise agglomerated iron oxides.

SUMMARY OF THE INVENTION

It is an object of the present invention to provide a method and an apparatus for producing DRI in a reduction system which avoids the problems caused by the decreased strength of iron-oxide-containing particles inside the reactor such as agglomeration, channelization and sticking.

It is a further object of the invention to provide a method and an apparatus for reducing the overall energy requirements or increasing the plant capacity at the same rate of energy consumption.

According to the present invention, the objects thereof are achieved by providing a method and apparatus by the following preferred embodiment:

A method for producing DRI from iron ore particles, in a reduction system whereby a preheating device heats said particles to a temperature above 700° C. in an oxidizing atmosphere before the particles enter the reduction reactor, thus avoiding the formation of fines inside the reactor shaft.

Said reduction system comprises a moving bed reduction reactor having a reduction zone where iron-oxide-containing particulate materials are, at least partially, chemically reduced to metallic iron by a high-temperature reducing gas which comprises hydrogen and carbon monoxide as reducing agents. Said reduction reactor also comprises a discharge zone where said metallic iron lumps are discharged in either a hot or cold mode.

Said method comprises introducing the iron-oxide-containing particles into a preheating device where said particles are contacted with a hot non-reducing gas stream; heating said particles to a temperature in the range of 75° C. to 1,100° C. discharging said hot iron-oxide-containing particles into the reduction zone of the reduction reactor at a temperature above 700° C.; contacting said particles with the reducing gas reducing said iron-oxides to metallic iron; withdrawing said sponge iron particles through the discharge zone; and withdrawing off-gas from said reduction zone at a temperature above about 500° C. and exchanging heat from said hot off-gas with another gas stream of the reduction system; regenerating the reducing potential of at least a portion of said off-gas by removing at least one of the oxidants produced in the reduction reactor $H_2O$ and $CO_2$ therefrom and optionally, utilizing said regenerated off-gas along with natural gas to produce more reducing gases in a reformer or in said reduction reactor.

BRIEF DESCRIPTION OF THE DRAWINGS

In this specification and in the accompanying drawings, some preferred embodiments of the invention are shown and described. Various alternatives and modifications thereof have been suggested, but it is to be understood that these are not intended to be exhaustive, and that many changes and modifications can be made within the scope of the invention. The suggestions herein described are selected and included for illustrative purpose only, in order that others skilled in the art will more fully understand the invention and the principles thereof and will thus be enabled to modify it in a variety of forms, each as may be best suited to the conditions of a particular use.

DETAILED DESCRIPTION OF PREFERRED EMBODIMENTS OF THE INVENTION

Figure 1:
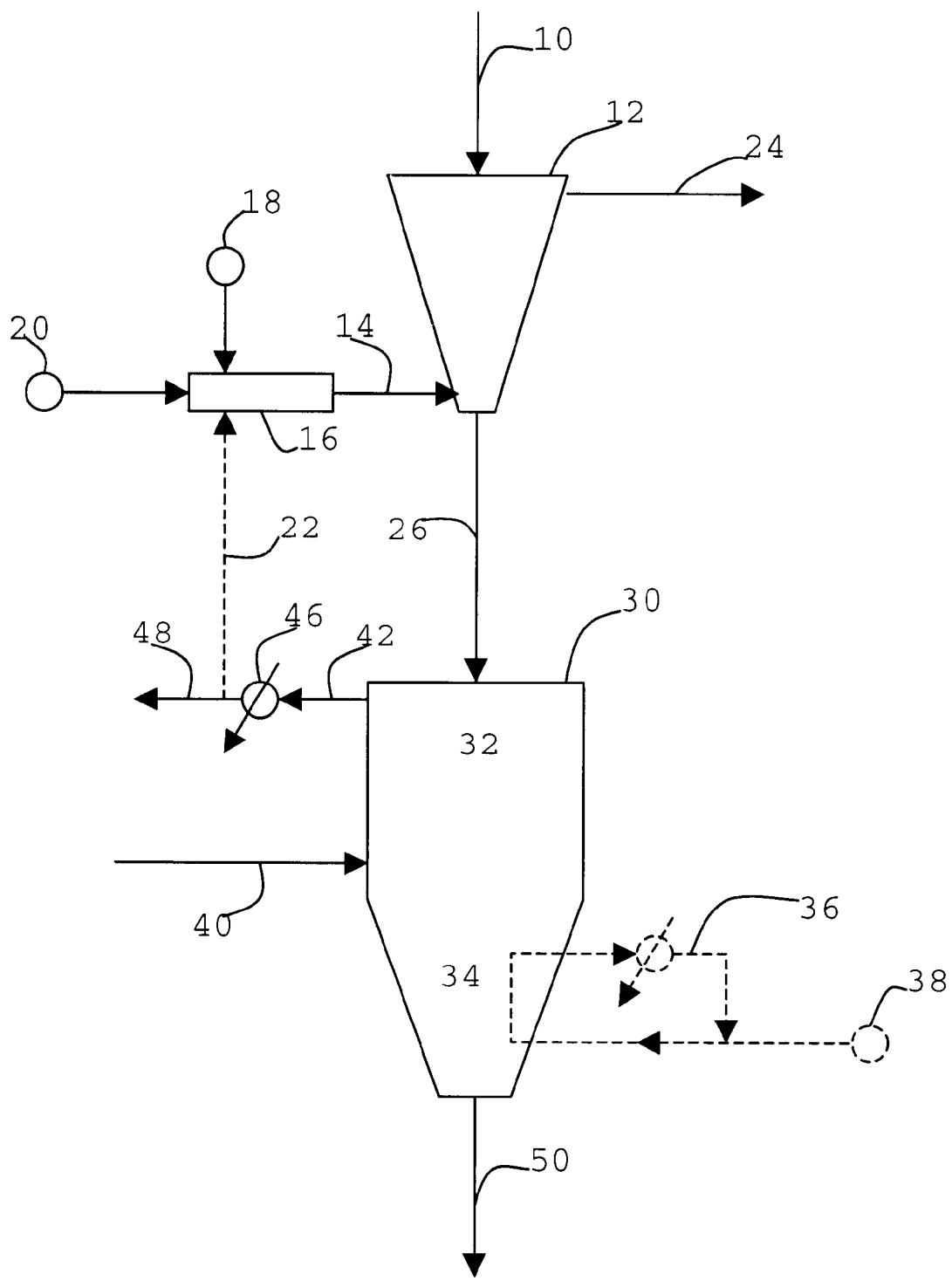
FIG. 1 shows schematically a preferred embodiment of the present invention, illustrating the preheating device feature of the inventive process and apparatus for producing DRI.

FIG. 1 shows a schematic diagram of a preferred embodiment of the present invention. Iron-oxide-containing particles 10 are fed to a preheating device 12 (in this case a hopper) where said particles are contacted with hot combustion gases 14 which provide an oxidizing atmosphere in the preheating device 12 and raise the temperature of the particles. Said combustion gases 14 are produced by the combustion of a suitable fuel 18, for example natural gas, with air 20 in a combustion chamber 16. In this combustion chamber 16, portion of the off reducing gas 22 may be fed as a supplementary fuel after having been withdrawn from the reduction reactor 30 as stream 42 and after having been cooled down in cooler 46. The other portion of the cooled off gas stream 48 is recycled in a manner known in the art to regenerate the reducing potential of said gas stream.

The hot iron-oxide-containing particles are heated to a temperature of at least 700° C. and then fed to the reduction zone 32 of the reduction reactor 30, through conduit 26 in a way known in the art, wherein reducing gas 40 is contacted with said particles to reduce the iron oxides to metallic iron. Since the temperature of the particles are already above 700° C. and the reduction starts above said temperature, the particles do not pass through the temperature range where the mechanical strength of said particles is seriously affected because there is no reduction when the temperature of the particles is within said range. After the particles are at least partially reduced to metallic iron forming the product sponge iron 50, they are withdrawn from the reduction reactor 30 through the discharge zone 34. Whereat said discharge zone 34, a cooling system 36 with a cooling gas supply 38 can be used to discharge said sponge iron 50 at near ambient temperature below 100° C., to prevent reoxidation thereof.

Figure 2:
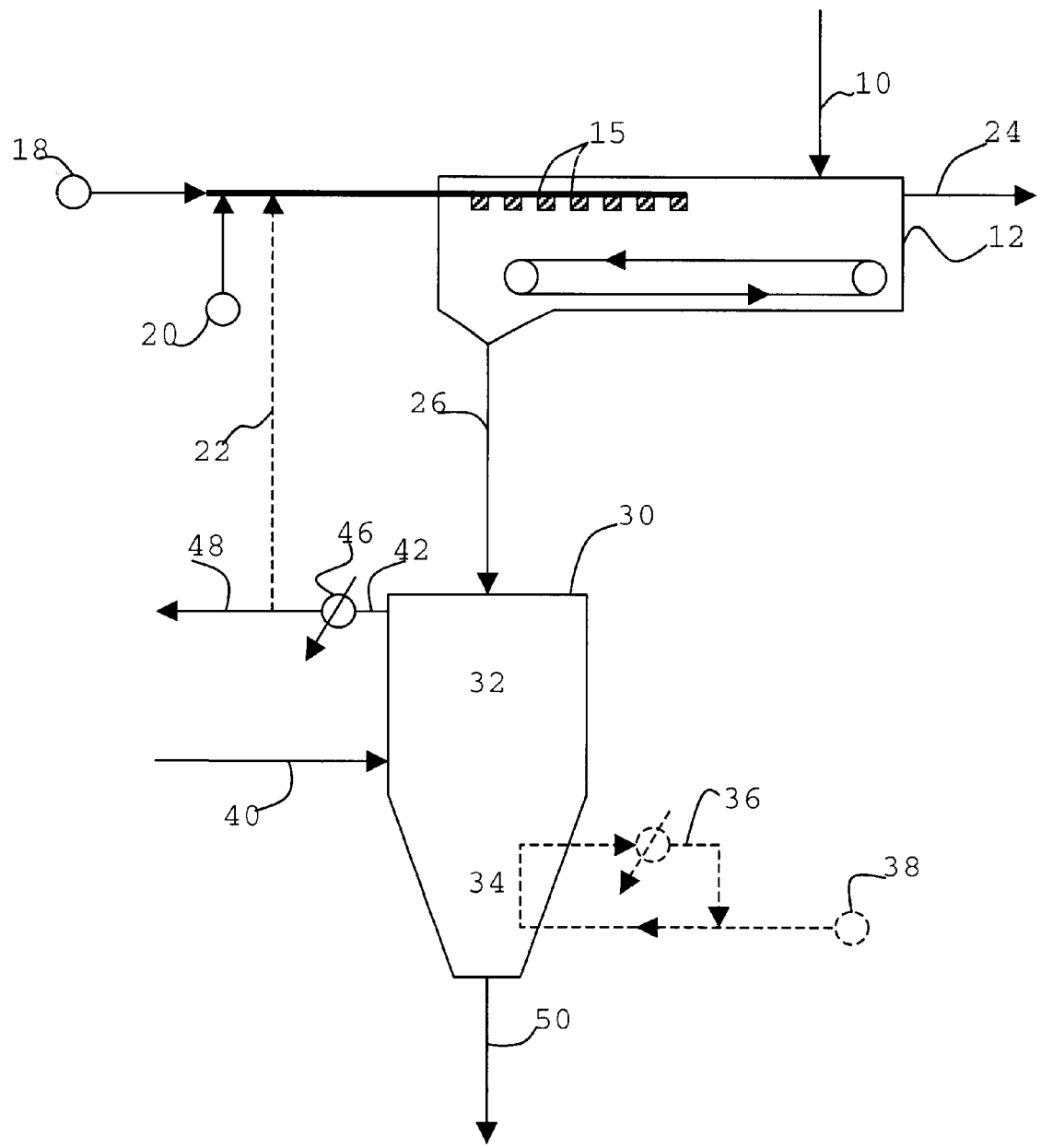
FIG. 2 shows schematically an alternative preferred embodiment of the present invention, similar to FIG. 1 but with a modification including a tunnel furnace.

FIG. 2 shows another embodiment of the present invention. Iron-oxide-containing particles 10 are fed to a preheating device 12, in this case a tunnel furnace, where they are contacted with hot combustion gases that provide an oxidizing atmosphere. Said combustion gases may be produced by the combustion of a suitable fuel 18 with air 20 in several burners 15. The off reducing gas 22 may be fed as a supplementary fuel after having been withdrawn from the reduction reactor 30 as gas stream 42 and after having been cooled in a cooler 46. The other portion of the cooled off reducing gas stream 48 is recycled in a manner known in the art to regenerate reducing gas.

Figure 3:
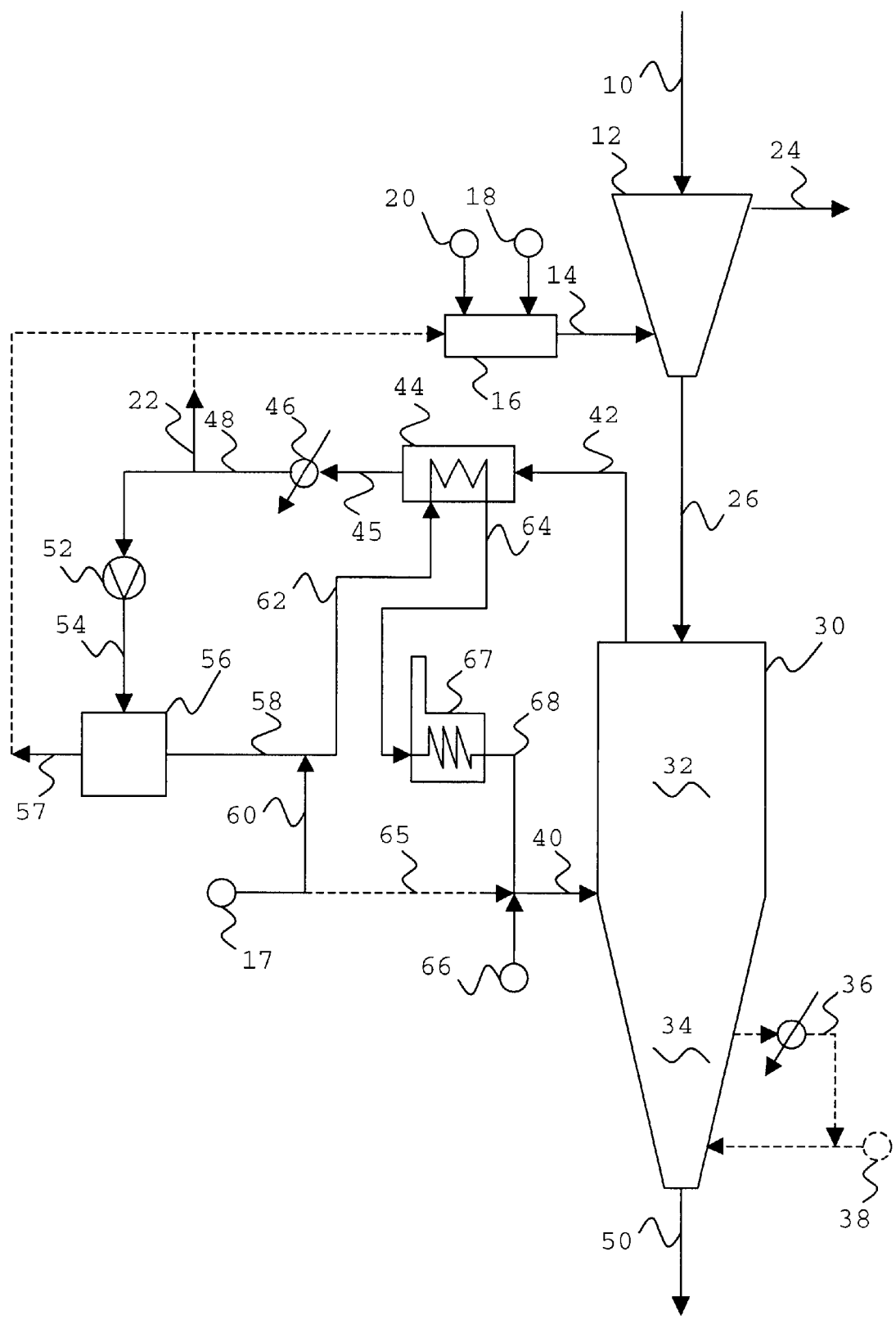
FIG. 3 shows schematically another embodiment of the present invention, illustrating the preheating device being of FIG. 1 and showing a preferred reducing gas scheme using no reformer and only a gas heater.

FIG. 3 shows a further embodiment of the invention, with the preheating device 12 as in FIG. 1, but additionally including the reducing gas circuit in order to better explain the additional advantages of performing the invention in the direct reduction plants. As in FIG. 1, the preheated iron ore is introduced through conduit 26 to the reducing zone 32 in the reduction reactor 30. The off reducing gas 42 which may be, for example, at a temperature greater than about 700° C., is passed through a heat exchanger 44 and is partially cooled as stream 45 to a temperature from about 200 to 500° C., and then is sent to the cooler 46 where it is cooled down as the cooled off gas stream 48 at a temperature from about 30 to 40° C. A small portion 22 of the cooled off gas 48 can be purged from the system and optionally can be burned in the combustion chamber 16 for the preheating device 12. The unpurged cooled off gas 48 is passed through compressor 52 forming a high pressure recycled gas stream 54, which is sent to a $CO_2$ scrubbing unit 56 producing a $CO_2$-lean recycled gas 58 and a $CO_2$ containing gas 57 which can be optionally sent to be burned. The $CO_2$ scrubbing unit 56 can be a pressure swing adsorption (PSA), a vacuum pressure swing adsorption (VPSA) or a conventional chemical absorption unit. Makeup natural gas 60 from supply 17, is combined with the $CO_2$-lean recycled gas 58 forming the cool recycled reducing gas stream 62, which may be, for example, at a temperature of about 50° C. Because the material introduced to the reducing zone 32 is at high temperature, the off reducing gas 42 exits the reduction reactor 30 at a higher temperature, for example, at a temperature greater than about 700° C., than compared with the processes known in the art (i.e., U.S. Pat. No. 5,858,057 to Celada-González et al., the content of which, together with all the other patents cited herein, are incorporated herewith by reference). To take advantage of the heat of this stream 42, stream 62 is passed through the heat exchanger 44 forming the partially heated gas 64. The minimum temperature difference between the streams 42 and 64 is preferred to be greater than about 50 degrees C., in order to have a good heat exchange in a "conventional" heat exchanger. The partially heated gas 64, which may be for example, at a temperature greater than about 650° C., is sent to a smaller-sized gas heater 67 elevating its temperature to produce a hot gas 68, which may be, for example, at a temperature elevated to about 750° C. Oxygen, air enriched with oxygen, or air 66 is combined with the hot gas 68 and introduced as the reducing gas at high temperature 40 which may be at a temperature of at least about 850° C. Additionally, natural gas 65 can be added at this point if desired. This embodiment has the advantage that the reformation of the components of the reducing gas at high temperature takes place inside the reduction reactor 30, more specifically in the reducing zone 32 (see, for example, U.S. Pat. No. 4,528,030).

Figure 4:
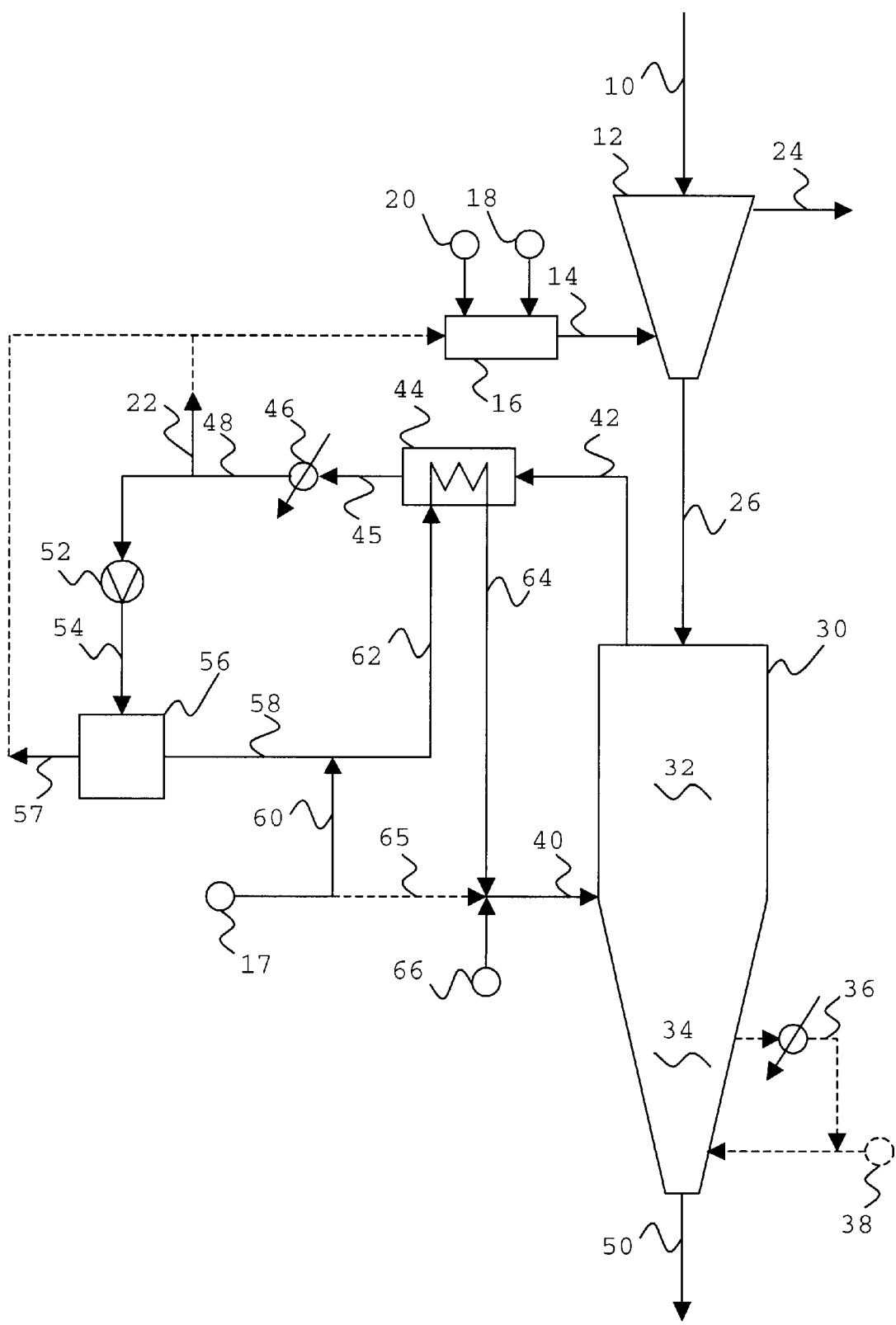
FIG. 4 shows schematically another embodiment of the present invention as in FIG. 3, with the difference being that the reducing gas scheme uses no reformer and no heater to produce the reducing gas.

FIG. 4 shows a variation of the embodiment of FIG. 3 omitting the heater. As mentioned above, the temperature of the off reducing gas 42 can be a temperature higher than the normal top gas temperature. In this case and as a further variation to the embodiment, the gas supply 17 can be a conventional steam-natural gas reformer and therefore the make up gas 60 can optionally be reformed gas. Heat exchanger 44 heats stream 62 delivering the heated gas stream 64 to a temperature high enough which is suitable to reach the reforming temperature when an oxygen containing gas 66 is combined. In this embodiment, the gas heater 67 is dispensed and the formed stream 40 is directed to the reduction reactor 30.

Figure 5:
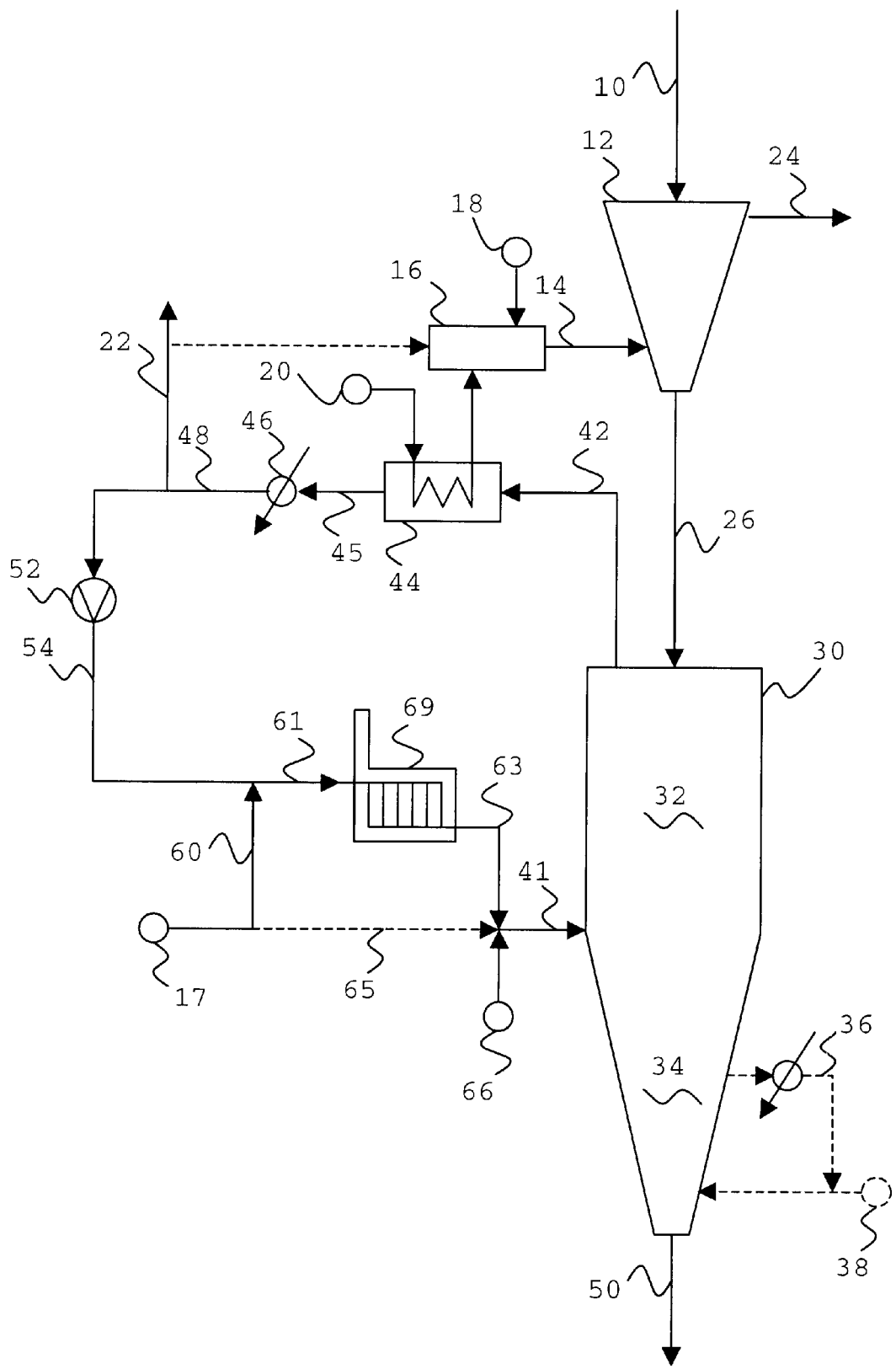
FIG. 5 shows schematically another embodiment of the present invention according to FIG. 3, illustrating a conventional reducing gas scheme using a reformer to produce the reducing gas.

FIG. 5 shows another embodiment of the invention based on FIG. 3, with the difference that the reformation of the reducing gas is performed outside the reducing zone 32 by using a gas reformer 69. In this scheme, the heat exchanger 44 is used to preheat the air 20 used during the combustion of fuel 18 in combustion chamber 16 to produce the hot combustion gases in the preheating device 12. Because the gas reformer 69 utilizes the oxidants contained in the high pressure recycled gas 54, the $CO_2$ removal unit 56 (shown on FIGS. 3 and 4) is not necessary. The high pressure recycled gas 54 is combined with natural gas 60 forming the reducing gas 61 with oxidants which is not completely reformed. This reducing gas with oxidants 61 and is sent directly to the gas reformer 69. The resulting reducing gas stream 63 is at high temperature but this can be increased by the addition of an oxygen containing gas 66 forming the hot reducing gas 41 which is introduced in the reducing zone 32 of the reduction reactor 30. As in the previous embodiments, natural gas 65 can additionally or alternatively be combined with the reducing gas 63 prior to its introduction to the reducing zone 32, if desired.

What is claimed is:

1. A method for reducing iron-oxide-containing particles in the solid state by reaction of said iron oxides with a reducing gas stream at a temperature higher than about 850° C., said method comprising:

feeding a particulate material containing iron oxides to a preheating device;

heating said particulate material to a temperature above about 600° C. with a non-reducing gas;

feeding said heated particulate material to a reduction chamber;

introducing to said reduction chamber wherein said iron oxides are, at least partially, chemically reduced to metallic iron;

introducing a first stream of a reducing gas comprising hydrogen, carbon monoxide and methane into said chamber at a temperature above about 850° C. to effect the reduction of said particulate material;

withdrawing a second stream of reducing gas from said reduction chamber;

cooling at least a portion of said second stream of reducing gas;

removing water from at least a portion of said second stream of reducing gas;

recycling and pressuring at least a portion of said cooled gas forming a third stream;

reforming at least a portion of said third stream by means of a gas reformer, forming a fourth stream mainly comprising hydrogen and carbon monoxide as its main constituents;

combining an oxygen-containing gas to said fourth stream forming said first stream;

introducing said first stream to said reduction chamber; and, removing the metallic iron from said reduction chamber.

2. A method for reducing iron-oxide-containing particles in the solid state by reaction of said iron oxides with a reducing gas stream at a temperature higher than about 850° C., said method comprising:

feeding a particulate material containing iron oxides to a preheating device;

heating said particulate material to a temperature above about 600° C. with a non-reducing gas;

feeding said heated particulate material to a reduction chamber;

introducing to said reduction chamber wherein said iron oxides are, at least partially, chemically reduced to metallic iron;

introducing a first stream of a reducing gas comprising hydrogen, carbon monoxide and methane into said chamber at a temperature above about 850° C. to effect the reduction of said particulate material;

withdrawing a second stream of reducing gas from said reduction chamber;

cooling at least a portion of said second stream of reducing gas;

removing water from at least a portion of said second stream of reducing gas;

recycling and pressuring and removing $CO_2$ at least a portion of said cooled gas forming a third stream;

preheating at least a portion of said third stream with heat of at least a portion of said second stream, forming a fourth stream;

combining an oxygen-containing gas to said fourth stream forming said first stream;

introducing said first stream to said reduction chamber; and, removing the metallic iron from said reduction chamber.

3. The method according to claim 2, further comprising utilizing said regenerated off-gas along with natural gas to produce more reducing gases in a reformer or in said reduction reactor.

4. A method according to claim 2, wherein said preheating temperature of said iron oxides is within the range between about 700° C. and 850° C.

5. A method according to claim 2, wherein said iron-oxide-containing particles are lumps of iron ore.

6. A method according to claim 2, wherein said iron-oxide-containing particles are pellets of iron ore.

7. A method according to claim 2, wherein said iron-oxide-containing particles are non-indurated pellets of iron ore and are preheated to temperatures above 1200° C.

* * * * *